May 17, 1949.  A. C. HALLMARK  2,470,164
AUTOMATIC AIR GAUGE
Filed Dec. 18, 1947

Aubrey C. Hallmark
INVENTOR.

BY
Attorneys

Patented May 17, 1949

2,470,164

UNITED STATES PATENT OFFICE 2,470,164

AUTOMATIC AIR GAUGE

Aubrey C. Hallmark, Naval Base, S. C.

Application December 18, 1947, Serial No. 792,485

6 Claims. (Cl. 137—69.5)

This invention relates generally to gauges, more particularly to an automatic shut off air gauge adapted to limit the pressure on the outlet side of the gauge to a predetermined setting of the gauge.

The primary object of this invention is to provide a gauge which is particularly well adapted for use in inflating tires of automotive vehicles, and kindred devices necessitating a reasonably accurate limitation of the pressure applied to the devices.

Another object of this invention is to provide a device of this character in which the shutting off of the air is automatically accomplished.

Still another object of this invention is to provide a device of this character which is very easy to apply to a valve stem, and in which the mechanism controlling the limitation of pressure is positively acting.

Yet another object of this invention is to provide a gauge of this character which is not bulky, which has no projecting parts and is therefore very safe to use, and which can be made very light in weight so that the device may be conveniently secured on the end of an air hose.

And the last object to be particularly mentioned is to provide an automatic shut off air gauge which is relatively inexpensive and practicable to manufacture, which is very convenient and simple to operate, and which will give generally efficient and durable service.

With these objects definitely in view, together with other objects of a specific nature which will appear hereinafter as this description proceeds, this invention resides in certain novel and improved arrangement, combination and construction of elements and portions which will be hereinafter described in the specification, particularly pointed out in the appended claims, and illustrated in the accompanying drawings which form a material part of this application, and in which:

Similar characters of reference designate similar or identical elements and portions throughout the specification and throughout the several views of the drawings.

Figure 1:
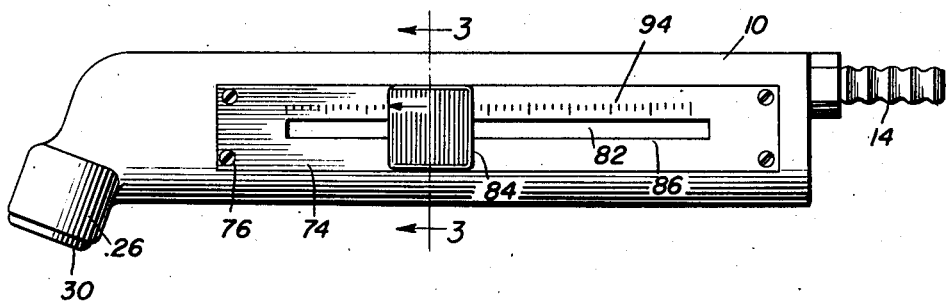
Figure 1 is a side elevational view of the assembled gauge.
Figure 2:
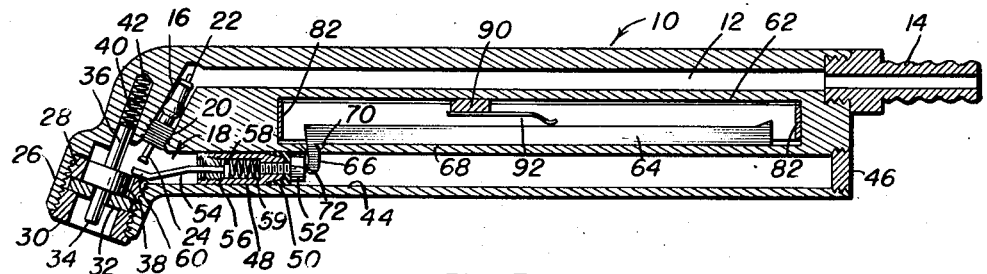
Figure 2 is a longitudinal vertical sectional view of the gauge, taken substantially along the longitudinal center line of the gauge.
Figure 3:
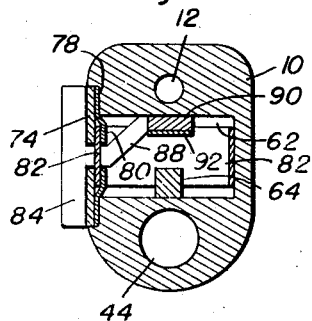
Figure 3 is a transverse vertical sectional view of the gauge, taken on the line 3—3 of Figure 1 and in the direction of the arrows.

Referring now to the drawings in detail, this invention includes a body represented as being of elongated form and generally indicated by the numeral 10. The body is longitudinally bored at 12 and a nipple 14 is threadedly secured to one end of the body in communication with the bore 12, this nipple being adapted to receive an end of an air hose of conventional design. The other end of the bore 12 is illustrated as inclined at an angle less than 90 degrees and this inclined portion 16 of the bore communicates with the chamber 18, a throat portion of the inclined bore 16 being internally threaded to receive the threaded securing collar 20 of a check valve which will ordinarily be of the type commonly termed a valve core as used in many types of pneumatic equipment. The remaining portions of this core 22 are disposed within the inclined bore 16, which must, therefore, be of a sufficient length to accommodate the same. The core plunger 24 extends into the chamber 18. A neck portion 26 of the body 10, adjacent the chamber 18, is disposed in substantially the same direction as the inclined bore 16 and this neck portion is interiorly threaded to receive internally an externally threaded sleeve 28 and an externally threaded bushing 30, the latter having an internal diameter sufficiently large to receive the end of a conventional valve stem in sliding relation. A washer 32 of rubber or of similar resilient material is inserted between the sleeve 28 and the bushing 30 and this washer is centrally apertured to receive a valve actuating pin 34 carried by the outlet valve 36, a plunger portion 38 of which is guided by the internal sleeve 28, while a spring 40 is compressed within a bore 42 and between the ends of this bore and the end of the outlet valve stem, all as clearly indicated in Figure 2. It should be carefully noted that the plunger portions 24 and 38 of the two valves are mounted to move in substantially the same direction.

The casing 10 is also provided with a bore 44 communicating with the chamber 18 and closed by a screw plug 46. A piston 48 having a sealing washer 50 secured on one end thereof by a headed stud 52, is reciprocatively mounted within the bore 44. This piston is hollow and carries an irregularly shaped member 54 which is inserted through a centrally apertured plug 56 vertically secured in the open end of the piston 48 disposed toward the chamber 18. The member 54 is provided with an enlarged head 58 adapted to abut the plug 56 and a spring 59 is compressed between this head 58 and the head of the piston. It will be carefully noted that the end 60 of the member 54 projects slightly beyond the inner edge of the sleeve 28 so as to engage the plunger 38 when the piston 48 is in position illustrated in Figure 2 and when the spring 58 is fully extended.

An elongated recess 62 is provided in the body 10 between the bores 12 and 44, this recess opening on one side of the body 10. An elongated lever 64 has a laterally extending arm 66 at one end thereof adjacent the piston 48, and it is preferred that the wall 68 between the bore 44 and the recess 62 should be apertured, as indicated at 70, to allow this laterally extending arm 66 to extend into the bore 44 so that a knife edge 72 on the outer extremity of the arm 66 may contact the head of the stud 52, while the portion of the wall 68 surrounding the aperture 70 comprises a fulcrum for the lever 64.

The recess 62 has been described as open on one side of the body 10, and this opening is closed by a plate 74 which may be secured to the body by screws 76, while the inner side of the plate 74 carries a pair of plate members 78 having portions 80 disposed toward the center of the plate 74 offset inwardly to receive an endless strap 82, that is, that portion of the endless strap disposed toward the plate 74, it being understood that this flexible strap comprises a loop of a length corresponding generally with the length of the recess 62. A finger grip 84 is mounted for longitudinal sliding movement on the plate 74, this plate having a longitudinally disposed slot 86 which receives an arm 88 carried by the finger grip 84 and terminating at its inner end in a block 90 which is thus made freely slidably adjustable longitudinally of the recess 62. This block 90 carries a flat spring 92, the free end of which contacts the side of the lever 64 remote from the bore 44. Indicia 94 will be placed on the plate 74 so as to constitute a scale of pressures obtainable by the use of this gauge, the scale being read, of course, with reference to an edge of or indicia on the finger grip 84.

The operation of this invention will be clearly understood from the foregoing description of the mechanical details thereof, taken in connection with the above recitation of the objects thus to be achieved by this invention. In recapitulation, it may be noted that movement of the finger grip 84 will shift the spring 92 along the lever 64. Obviously this shifting of the spring 92 will cause a variation in the pressure required to move the piston 48. When a valve stem of the article to be inflated is inserted into the bushing 30, the valve plunger in this valve stem will contact the actuating pin 34 and push this actuating pin inwardly so that the plunger 38 moves the end 60 of the member 54 into contact with the plunger 24, and pressurized air will be admitted into the chamber 18 and into the article being inflated. However, when the pressure is increased sufficiently within the chamber 18 to move the piston 48, that is, to actuate the lever 64 against the action of the spring 92 as positioned by the finger grip 84, then the end 60 of the member 54 will be moved from its position between the plungers 24 and 38. The plunger 24 will snap back into position closing the inlet valve, and upon removal of the gauge from the valve stem of the article being inflated, the pressure in the chamber 18 will drop to that of the atmosphere and the spring 40 will urge the valve 36 back into the position represented in Figure 2. It should be carefully noted that the spring 58 is considerably weaker than the spring 40, so that the valve 36 will not be prevented from closing by contact of the end 60 of the member 54 with the plunger 38.

Many minor variations may be made in the details of construction and proportionment of the various elements of this invention all without departure from the scope of this invention and the drawings should be considered as illustrative rather than limiting. Accordingly, this invention should be limited only as determined by a proper interpretation of the terminology in the subjoined claims.

Having described the invention, what is claimed as new is:

1. An automatic shut off air gauge comprising an elongated body having an air inlet channel and a chamber therein, an inlet valve controlling flow between said channel and chamber, an outlet valve for said chamber and having means whereby it can be opened by externally applied force, a member providing in one position mechanical contact between said valves so that opening of the outlet valve causes the inlet valve to open, shiftable means responsive to pressure within said chamber and connected to said member for moving said member out of said one position when a predetermined pressure in the chamber is attained, and variable biasing means operatively connected with said shiftable means.

2. An automatic shut off air gauge comprising an elongated body having an air inlet channel and a chamber therein, an inlet valve controlling flow between said channel and chamber, an outlet valve for said chamber and having means whereby it can be opened by externally applied force, a member providing in one position mechanical contact between said valves so that opening of the outlet valve causes the inlet valve to open, shiftable means responsive to pressure within said chamber and connected to said member for moving said member out of said one position when a predetermined pressure in the chamber is attained, and variable biasing means operatively connected with said shiftable means, said valves each having plungers operating in substantially the same direction, and said member being disposed between adjacent portions of said plungers when in said one position.

3. An automatic shut off air gauge comprising an elongated body having an air inlet channel and a chamber therein, an inlet valve controlling flow between said channel and chamber, an outlet valve for said chamber and having means whereby it can be opened by externally applied force, a member providing in one position mechanical contact between said valves so that opening of the outlet valve causes the inlet valve to open, shiftable means responsive to pressure within said chamber and connected to said member for moving said member out of said one position when a predetermined pressure in the chamber is attained, and variable biasing means operatively connected with said shiftable means, said body having a cylinder communicating with said chamber, said shiftable means comprising a piston in said cylinder, and said member being carried by said piston.

4. An automatic shut off air gauge comprising an elongated body having an air inlet channel and a chamber therein, an inlet valve controlling flow between said channel and chamber, an outlet valve for said chamber and having means whereby it can be opened by externally applied force, a member providing in one position mechanical contact between said valves so that opening of the outlet valve causes the inlet valve to open, shiftable means responsive to pressure within said chamber and connected to said member for moving said member out of said one position when a predetermined pressure in the chamber is attained, and variable biasing means operatively connected with said shiftable means, said biasing means including a lever operatively connected with said shiftable means, and a spring longitudinally adjustable on said lever to bias the lever in one direction to move said shiftable means so that said member is moved into said one position.

5. A gauge according to claim 4 and in which said spring has a carrier slidably mounted on the body, said carrier having an arm terminating in a finger grip extending exteriorly of the body for manual adjustment of the spring along said lever.

6. A gauge according to claim 5 and in which said body has an elongated recess to house said spring and lever and having an opening on side of said body, a plate covering said opening, a slot in said plate for said arm, and a flexible endless strap disposed within said recess to cover said slot, said strap being connected to said arm to move therewith.

AUBREY C. HALLMARK.

REFERENCES CITED

The following references are of record in the file of this patent:

UNITED STATES PATENTS

| Number | Name | Date |
|---|---|---|
| 1,495,553 | Durham | May 27, 1924 |
| 1,765,850 | Richardson | June 24, 1930 |
| 1,768,275 | Urton | June 24, 1930 |